B. BACON.
Clock Escapement.
No. 54,277.
Patented May 1, 1866.
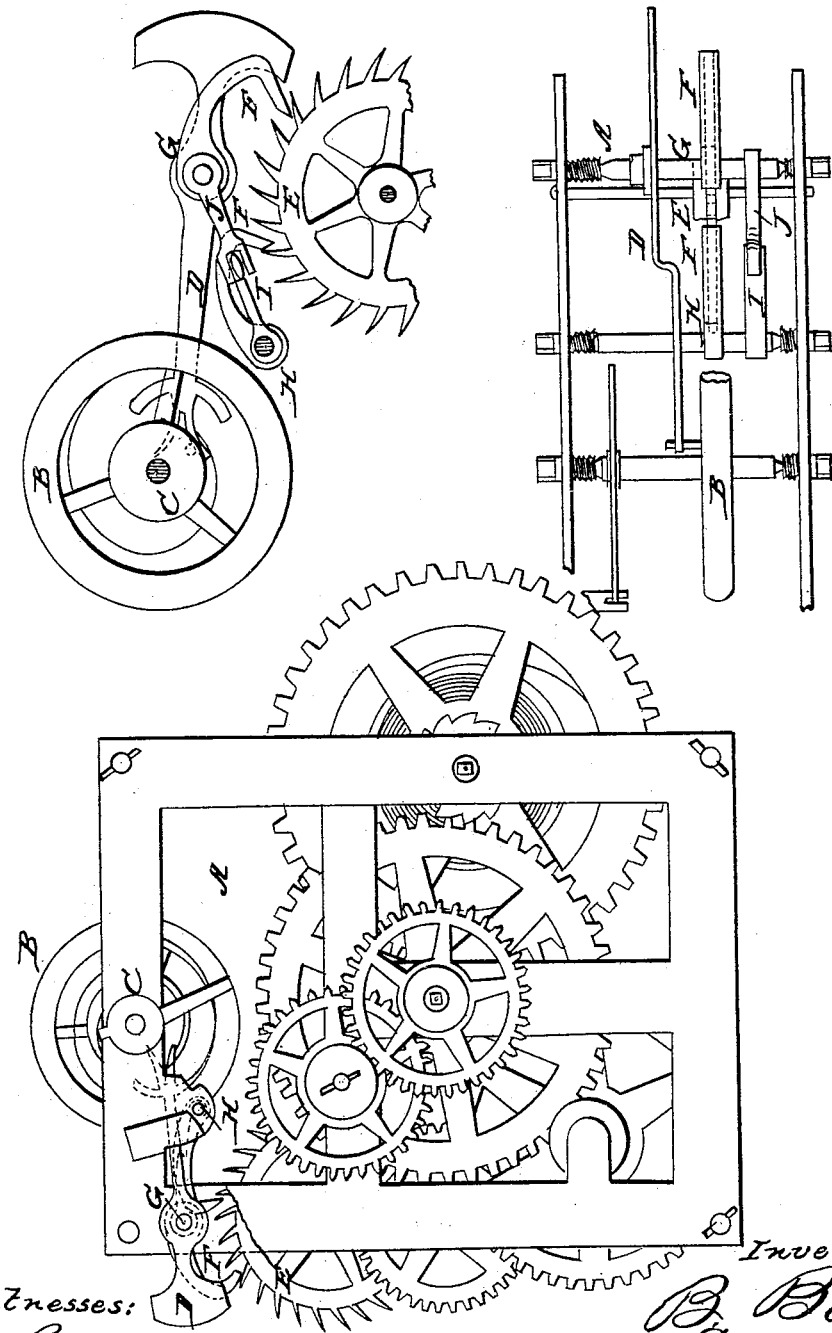

UNITED STATES PATENT OFFICE.

BENJAMIN BACON, OF MORRISON, ILLINOIS.

IMPROVEMENT IN CLOCK-ESCAPEMENTS.

Specification forming part of Letters Patent No. 54,277, dated May 1, 1866.

*To all whom it may concern:*

Be it known that I, BENJAMIN BACON, of Morrison, Whiteside county, and State of Illinois, have invented a new and useful Improvement in Clock and Watch Escapements; and I do hereby declare that the following is a full, clear, and exact description thereof, which will enable others skilled in the art to make and use the same, reference being had to the accompanying drawings, forming part of this specification, in which—

Figure 1 is an elevation in side view of the works of a clock in which my improvement is shown. Fig. 2 is a plan. Fig. 3 is a detailed view of the escapement.

Similar letters of reference indicate like parts.

This invention relates to escapements of clocks and watches; and it consists in constructing the pallet in two parts, each mounted on a different axis and pointing in the same direction, their faces moving in parallel arcs. They are connected to each other by means of arms fixed on their axis and extending toward each other, their ends being united to form a joint, whereby the motion of each part is regulated and controlled by the other.

The invention further consists in making the escape-wheel take hold of the pallets on the inside of their faces and work outward from their centers of motion, the power increasing as the escape-wheel moves until it leaves the pallets, whereas in the old escapement the escape-wheel takes hold on the outside of the acting-face of one of the pallets, the power consequently diminishing until it leaves the pallet.

My invention is in this example applied to a clock, A, whose frame supports the several axes of the train of gearing and other moving parts.

E designates the escapement-wheel, whose teeth may be of any suitable construction. B is the balance-wheel, and D is the balance-staff, mounted on an axis, G.

The letters F F designate two pallets, made independent of each other and mounted severally on the axes G and H. Both pallets point in the direction of the rotation of the escape-wheel, instead of one pointing in that direction and the other against that direction, as in ordinary escapements. The teeth of the escape-wheel are enabled, consequently, to take hold of the inner faces of both pallets, whereby their action on both pallets is made uniform, the maintaining power increasing its action on both of them until the escape-wheel leaves the pallets. Where the maintaining power is exerted on the outside of a pallet, and consequently against its direction of motion, the power it exerts on the pallet decreases until it leaves the pallet, and the force communicated is not regular and uniform with both vibrations of the pallets.

The pallets F F, although moving on separate axes or centers, are connected with each other by means of arms I J, that extend toward each other from the axes G H, on which they are respectively fixed. The end of the arm J is forked so as to receive the pointed end of arm I, thereby making a joint which insures the regular action of the pallets with respect to each other. The mode of connecting the pallets to each other is not material, and therefore, instead of making the joint and connecting the pallets on their axes in the way here described, the said axes or pallets may be connected by means of gears, or by segments having gear-teeth cut on them, or by a slot in one of the arms and a pin from the other arm playing therein.

It will be observed that both the pallets are alike, and that they work in the same direction, the regularity of their alternations with respect to each other, both rising away from the direction of motion of the escape-wheel, being insured by connecting them through their axes or otherwise, such connection being preferably made in the way that will produce the least friction.

What I claim as new, and desire to secure by Letters Patent, is—

The pallet above shown, consisting of two parts, each mounted on a different axis and connected to each other by arms jointed to each other, so that the motions of one of the parts is controlled by those of the other, substantially as described.

BENJAMIN BACON.

Witnesses:
WM. LANE,
MYRON MAJORS.